United States Patent
Miyamae et al.

(10) Patent No.: US 7,423,368 B2
(45) Date of Patent: Sep. 9, 2008

(54) PLASMA DISPLAY AND METHOD OF PRODUCING PHOSPHOR USED THEREIN

(75) Inventors: Yuichiro Miyamae, Osaka (JP); Masaki Aoki, Osaka (JP); Kazuhiko Sugimoto, Kyoto (JP); Keiji Horikawa, Kyoto (JP); Junichi Hibino, Kyoto (JP); Tanaka Yoshinori, Osaka (JP); Setoguchi Hiroshi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 195 days.

(21) Appl. No.: 10/537,156

(22) PCT Filed: Sep. 24, 2004

(86) PCT No.: PCT/JP2004/014415

§ 371 (c)(1),
(2), (4) Date: May 31, 2005

(87) PCT Pub. No.: WO2005/031784

PCT Pub. Date: Apr. 7, 2005

(65) Prior Publication Data

US 2006/0072301 A1    Apr. 6, 2006

(30) Foreign Application Priority Data

Sep. 26, 2003    (JP) .............................. 2003-335269

(51) Int. Cl.
*C09K 11/59* (2006.01)
*H01J 17/49* (2006.01)

(52) U.S. Cl. .................. 313/486; 313/582; 252/301.36; 252/301.4 R; 427/157; 427/64

(58) Field of Classification Search ................. 313/486, 313/582; 527/157, 64; 252/301.36, 301.4 R
See application file for complete search history.

(56) References Cited

U.S. PATENT DOCUMENTS 7,037,156 B2 * 5/2006 Nishimura et al. ............ 445/24

FOREIGN PATENT DOCUMENTS

| JP | 54-145386 | 11/1979 |
| JP | 2-283791 | 11/1990 |
| JP | 6-145659 | 5/1994 |
| JP | 11-86735 | 3/1999 |

(Continued)

OTHER PUBLICATIONS

"Phosphor Handbook", p. 219-220, published from Ohm Co., Ltd.

*Primary Examiner*—Nimeshkumar D. Patel
*Assistant Examiner*—Anthony T Perry
(74) *Attorney, Agent, or Firm*—Wenderoth, Lind & Ponack, L.L.P.

(57) ABSTRACT

The present invention relates to a plasma display device and to a method of producing a phosphor to be used for the device, that prevents the phosphor layer from deteriorating, and improves the luminance, life, and reliability, of a plasma display panel (PDP). The plasma display device is equipped with a plasma display panel in which a plurality of discharge cells are arranged, phosphor layers (110R, 110G, 110B) in color corresponding to each discharge cell are disposed, and phosphor layers (110R, 110G, 110B) are excited by ultraviolet light to emit light. Green phosphor layer (110G) has a green phosphor including $Zn_2SiO_4:Mn$, the element ratio of zinc (Zn) to silicon (Si) at the proximity of its surface is 2/1, which is the stoichiometric ratio, and the layer is positively charged or zero-charged.

2 Claims, 4 Drawing Sheets

FOREIGN PATENT DOCUMENTS

| | | |
|---|---|---|
| JP | 2001-234165 | 8/2001 |
| JP | 2001-236893 | 8/2001 |
| JP | 2003-183649 | 7/2003 |
| JP | 2003183650 A * | 7/2003 |

* cited by examiner

PLASMA DISPLAY AND METHOD OF PRODUCING PHOSPHOR USED THEREIN

This application is a U.S. National Phase Application of PCT International Application PCT/JP2004/014415.

TECHNICAL FIELD

The present invention relates to a plasma display device having phosphor layers that are excited by ultraviolet light to emit light, and to a method of producing a phosphor used for the device.

BACKGROUND ART

In recent years, plasma display devices using plasma display panels (hereinafter, referred to as "PDP" or "panel") receive attention as color display devices that implement a large screen size, a thin body, and a light weight in displaying color images for computers, television sets, and the like.

A plasma display device displays full color by means of additive color mixing of so-called three primary colors (red, green, and blue). For displaying full color, a plasma display device is provided with phosphor layers that emit light in the three primary colors: red (R), green (G), and blue (B). Phosphor particles composing the phosphor layers are excited by ultraviolet light occurring in a discharge cell of the PDP, to generate visible light in each color.

Compounds used for the above-mentioned phosphors in each color include $(YGd)BO_3:Eu^{3+}$ and $Y_2O_3:Eu^{3+}$ for emitting red light; $Zn_2SiO_4:Mn^{2+}$ for green; and $BaMgAl_{10}O_{17}:Eu^{2+}$ for blue. These phosphors, after given raw materials being mixed therewith, are produced with solid-phase reaction by being fired at a high temperature above 1,000° C. This method is disclosed in "Phosphor Handbook (in Japanese)" (p. 219 to p. 220, by Ohmsha, Ltd., 1991), for example.

The phosphor particles produced by firing, after being lightly crushed to the extent of breaking aggregated particles but not the crystals, are screened (average particle diameter for red and green: 2 μm to 5 μm, for blue: 3 μm to 10 μm) before use. The reason for lightly crushing and screening (classifying) phosphor particles is as follows: That is, methods of forming a phosphor layer in a PDP include screen-printing of pasted phosphor particles in each color; and an ink-jet method, in which the paste is discharged through a nozzle for applying. Large agglomerates are included in a phosphor unless the phosphor particles are classified after being lightly crushed, and thus unevenness in coating and clogging in the nozzle may occur when coating with the pasted phosphors. Therefore, phosphors classified after being lightly crushed are small in particle diameter and even in particle size distribution, thus yielding a more desirable coated surface.

An example method of producing a green phosphor made of $Zn_2SiO_4:Mn$ is disclosed in "Phosphor Handbook (in Japanese)" (pp. 219-220, Ohmsha, Ltd., 1991). That is, $SiO_2$ is blended in ZnO at the rate of $1.5ZnO/SiO_2$, which is larger than its stoichiometric ratio ($2ZnO/SiO_2$), and then fired in the air (one atmospheric pressure) at 1,200° C. to 1,300° C., to produce a green phosphor. Therefore, the surface of the $Zn_2SiO_4:Mn$ crystal is covered with an excessive amount of $SiO_2$, and the phosphor surface is negatively charged.

The fact that a green phosphor in a PDP, negatively charged with a high level, degrades in its discharge characteristic, is disclosed in Japanese Patent Unexamined Publications No. H11-86735 and No. 2001-236893, for example. Further, it is known that ink-jet coating, in which coating is made continuously using negatively charged ink for a green phosphor through a fine-bore nozzle, causes clogging in the nozzle and unevenness in coating. These are because ethyl cellulose in the ink is in particular presumably resistant to being adsorbed in the surface of the negatively charged green phosphor.

Further, there is a problem in which a negatively charged phosphor causes ion collision of positive ions of Ne, CH-base, or H occurring while discharging with a negatively charged green phosphor, thus deteriorating the luminance of the phosphor.

Meanwhile, some methods are formulated such as laminate-coating positively charged oxide for changing a negative charge on the surface of $Zn_2SiO_4:Mn$ to a positive one, and mixing a positively charged green phosphor for apparently positive charge. However, it is problematic that laminate-coating oxide causes a low luminance, and applying two different kinds of phosphor with a charge state different from each other tends to generate clogging and unevenness in coating. In addition, there is a method in which ZnO and $SiO_2$ are blended in advance at the ratio of 2:1 or more (2/1 or more of Zn/Si in element ratio) when producing $Zn_2SiO_4:Mn$, and ZnO is scattered (sublimed) in advance while firing, utilizing the vapor pressure of ZnO higher than $SiO_2$, when firing the phosphor in the air or in nitrogen at 1 atmospheric pressure at 1,200° C. to 1,300° C. However, even in such a case, the proximity of the crystal surface results in rich $SiO_2$ and negative charge by all means.

The present invention, in view of these problems, aims at preventing phosphor layers from deteriorating and at improving the luminance, life, and reliability of a PDP.

SUMMARY OF THE INVENTION

In order to achieve this purpose, a plasma display device of the present invention is equipped with a plasma display panel in which a plurality of discharge cells are arranged, phosphor layers are disposed with a color corresponding to each discharge cell, and the phosphor layers are excited by ultraviolet light to emit light. The phosphor layers include a green phosphor layer containing $Zn_2SiO_4:Mn$, and the green phosphor made of $Zn_2SiO_4:Mn$ has the element ratio of zinc (Zn) to silicon (Si) of 2/1 in stoichiometric ratio at the proximity of the surface.

According to such a makeup, phosphor particles in which the green phosphor crystal is positively charged or zero-charged allow the phosphor layer to be formed with an even coating, prevent the luminance degradation of the phosphor, and improve the luminance, life, and reliability of the PDP.

DETAILED DESCRIPTION OF PREFERRED EMBODIMENTS

Figure 1:
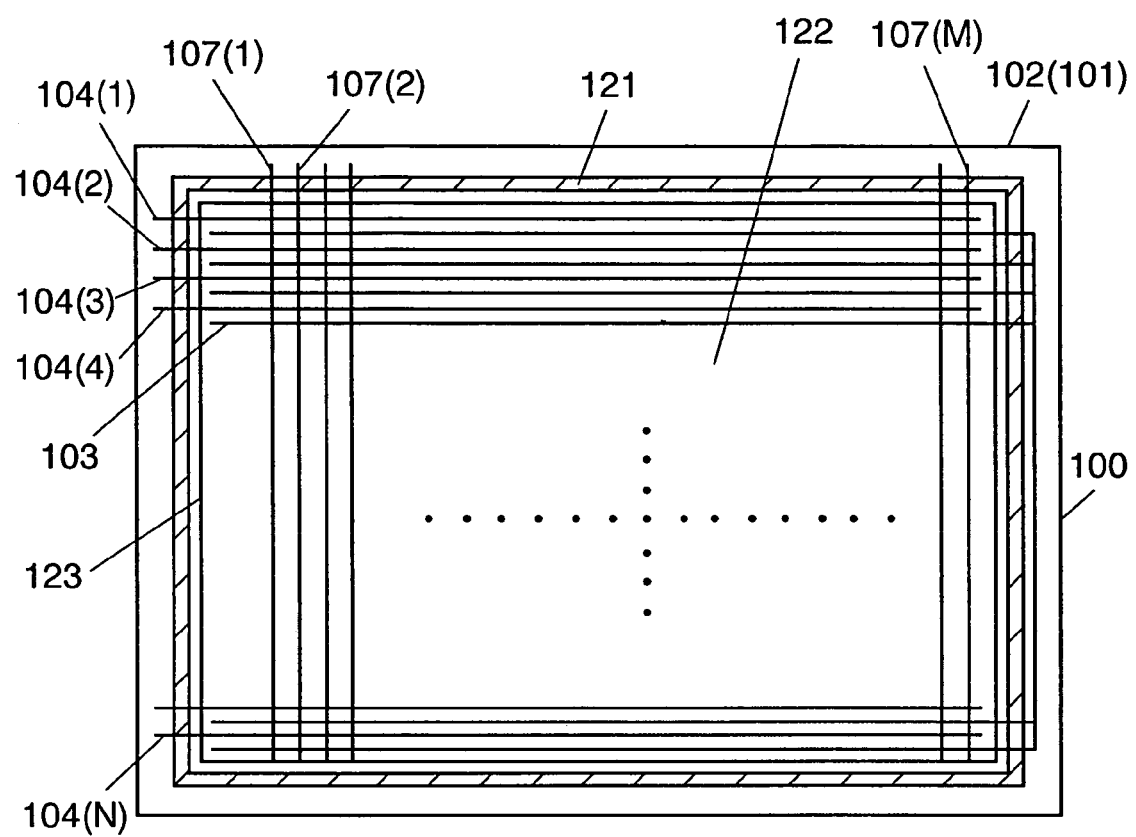
FIG. 1 is a plan view illustrating a state of a PDP with its front glass substrate removed, used for a plasma display device according to an embodiment of the present invention.

In the present invention, the element ratio of zinc (Zn) to silicon (Si) at the proximity of the surface of the green phosphor made of Zn2SiO4:Mn is assumed to be 2/1, which is the stoichiometric ratio. Further, the proximity of the surface of the green phosphor is positively charged or zero-charged. After ZnO, $SiO_2$, and $MnO_2$ as an activator are mixed, the mixture is pre-fired in the air at 600° C. to 900° C., and then fired at 1,000° C. to 1,350° C. in an atmosphere with 1 atmospheric pressure or higher (0.105 MPa or higher) including at least one of $N_2$, $N_2$—$O_2$, and Ar—$O_2$, to produce Zn2SiO4:Mn.

The green phosphor made of $Zn_2SiO_4$:Mn, used for a PDP, is usually produced with a solid-phase reaction method, where $SiO_2$ is blended in ZnO at a rate larger than its stoichiometric ratio, for improving luminance. This results in the surface of the $Zn_2SiO_4$:Mn crystal being covered with $SiO_2$. However, even if produced in the stoichiometric ratio so that the surface will not be covered with $SiO_2$, firing at 1,000° C. or higher causes ZnO at the proximity of the surface to be scattered (sublimed) early, due to the vapor pressure of ZnO being higher than that of $SiO_2$, resulting in more $SiO_2$ on the surface of the phosphor. If fired at 1,000° C. or lower so that ZnO will not be scattered (sublimed), although $Zn_2SiO_4$:Mn with its Zn/Si ratio of 2/1 is synthesized, a high-luminance phosphor is not produced due to its low crystallinity.

The present invention solves the above-mentioned problems with the following method. That is, set the element ratio of ZnO to $SiO_2$ to be blended, to its stoichiometric ratio (2.0/1), and then fire in an atmosphere with its pressure between 0.105 MPa (1 atmospheric pressure) and 150 MPa, more desirably, between 1 MPa and 100 MPa, including $N_2$ (nitrogen), $N_2$—$O_2$ (nitrogen-oxygen), or Ar—$O_2$ (argon-oxygen) in order to prevent the ZnO from being scattered (sublimed).

First, a description will be made for a method of producing a phosphor according to the present invention.

Methods of producing a phosphor body itself include the following. That is, one method is solid-phase sintering, where an oxidized or carbonated raw material, and flux are used. Another is method liquid-phase method, where a precursor of a phosphor is produced with hydrolysis of organometallic salt or nitrate salt in an aqueous solution, or with coprecipitation that precipitates organometallic salt or nitrate salt with alkali or the like added, and then the precursor is heat-treated to produce pre-fired powder. Yet another method is liquid spraying, where an aqueous solution with raw materials for a phosphor added is sprayed into a heated oven.

According to the present invention, with a phosphor precursor and pre-fired powder produced with any of the above methods, the discharge characteristic is improved and clogging in the nozzle is eliminated, as a result of using a green phosphor made of $Zn_2SiO_4$:Mn produced by firing in an atmosphere with its pressure between 1 and 1,500 atmospheric pressures (between 0.105 MPa and 152 MPa) including at least one of $N_2$, $N_2$—$O_2$, and Ar—$O_2$.

First, a description will be made for a method of producing $Zn_2SiO_4$:Mn with a solid-phase reaction method. After blending carbonate and oxide as the raw materials, such as ZnO, $SiO_2$, and $MnCO_3$, with the molar ratio of the base material $[(Zn_{1-x}Mn_x)_2SiO_4]$ for a phosphor, pre-fire them at 600° C. to 900° C. for 2 hours. Next, slightly crush and screen them, and then actually fire them in an atmosphere with its pressure between 1 and 1,500 atmospheric pressures (between 0.105 MPa and 152 MPa) including $N_2$, $N_2$—$O_2$, or Ar—$O_2$ at 1,000° C. to 1,350° C., to form a green phosphor.

Alternatively, in a liquid-phase method, where a phosphor is produced from an aqueous solution, the following process is employed. That is, dissolve organometallic salt (e.g. alkoxide, acetylacetone) or nitrate salt, into water in advance so that the element ratio of Zn/Si will be 2.0/1, which is the stoichiometric ratio of $Zn_2SiO_4$:Mn. Next, hydrolyze it to produce a coprecipitate (hydrate), and pre-fire it at 600° C. to 900° C. in the air. After that, actually fire it in an atmosphere with its pressure between 1 atmospheric pressure and 1,500 atmospheric pressure (153 MPa), more desirably between 0.105 MPa and 150 MPa, including at least one of $N_2$, $N_2$—$O_2$, and Ar—$O_2$, at 1,000° C. to 1,350° C. for 2 to 10 hours, and then classify it to produce a green phosphor.

In a green phosphor produced in this way, that is, by firing in an atmosphere with its pressure higher than 0.105 MPa including at least one of $N_2$, $N_2$—$O_2$, and Ar—$O_2$, at 1,000° C. to 1,350° C., ZnO is not scattered (sublimed) from the surface of the phosphor particles. Therefore, $Zn_2SiO_4$:Mn with Zn is produced that is even in its density extending from the surface to the inside of the phosphor. This results in a green phosopher with $Zn_2SiO_4$:Mn particles having an improved charge characteristic.

The reason for limiting the pressure when firing between 1 and 1,500 atmospheric pressures, more desirably between 0.105 MPa and 150 MPa, is that ZnO cannot be prevented from being scattered (sublimed) at 0.105 MPa or lower; the production cost becomes too high at 150 MPa or higher.

Next, a description will be made for a phosphor in each color used for a plasma display device according to the present invention. Concrete phosphor particles used for a green phosphor layer are desirably those made from $[(Zn_{1-x}Mn_x)_2SiO_4]$ as their parent body, produced with the aforementioned method, and the value of x desirably satisfies $0.01 \leq x \leq 0.2$ for advantages in luminance and luminance degradation.

As concrete phosphor particles for a blue phosphor layer, a compound expressed by $Ba_{1-x}MgAl_{10}O_{17}:Eu_x$ or $Ba_{1-x-y}Sr_yMgAl_{10}O_{17}:Eu_x$ can be used. Here, the values x and y of the compound desirably satisfy $0.03 \leq x \leq 0.20$, and $0.1 \leq y \leq 0.5$, respectively, for high luminance.

As concrete phosphor particles for a red phosphor layer, a compound expressed by $Y_{2-x}O_3:Eu_x$ or $(Y, Gd)_{1-x}BO_3:Eu_x$ can be used. Here, the value x of the compound for a red phosphor desirably satisfies $0.05 \leq x \leq 0.20$, for advantages in luminance and luminance degradation.

Hereinafter, a description will be made of an embodiment of a plasma display device according to the present invention, with reference to the drawings.

Figure 2:
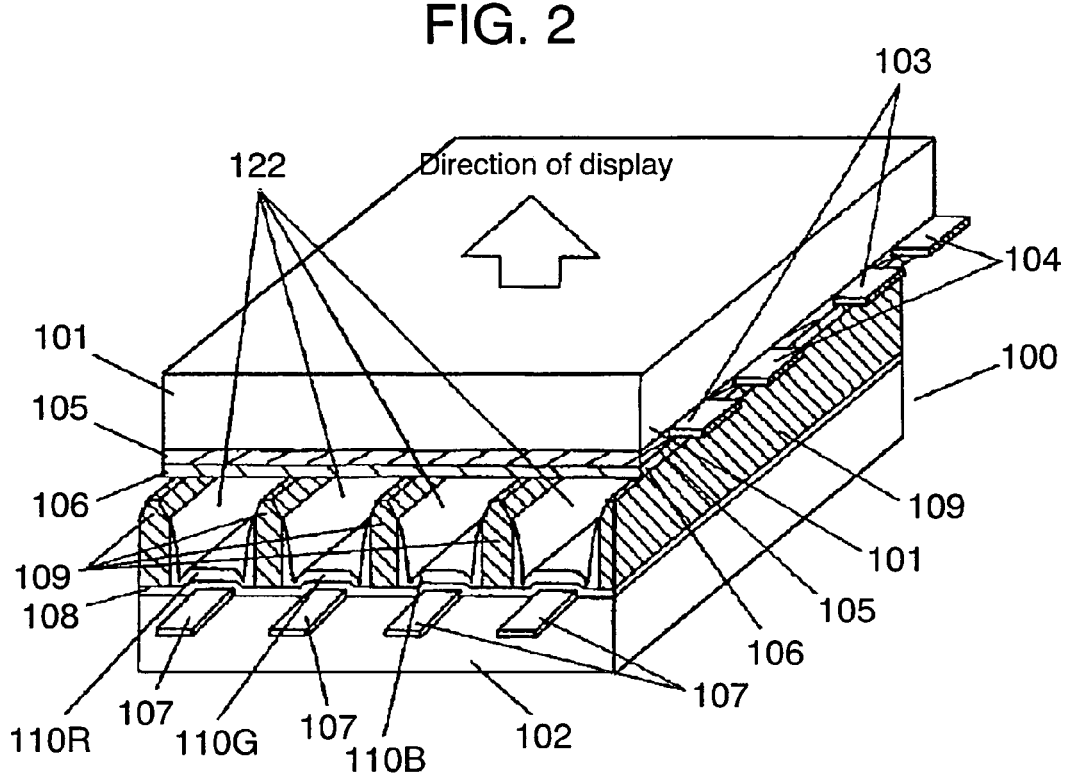
FIG. 2 is a perspective view illustrating the structure of the image display area of the PDP.

FIG. 1 is a plan view illustrating a state of a PDP with its front glass substrate removed, used for the plasma display device according to the embodiment of the present invention. FIG. 2 is a perspective view illustrating the structure of the image display area of the PDP. Here, FIG. 1 shows display electrodes, display scan electrodes, and address electrodes, with some of them omitted so as to be easily understood.

As shown in FIG. 1, PDP 100 is composed of front glass substrate 101 (not illustrated), rear glass substrate 102, N pieces of display electrodes 103, N display scan electrodes 104 (N is affixed for showing the Nth one), a group of M pieces of address electrodes 107 (M is affixed for showing the Mth one), and hermetic seal layer 121 shown by oblique lines. PDP 100 has an electrode matrix with a three-electrode structure composed of display electrode 103, display scan electrode 104, and address electrode 107; and a display cell is formed at the intersecting point of display electrode 103 and display scan electrode 104, and address electrode 107, forming image display area 123.

This PDP 100, as shown in FIG. 2, is composed of a front panel with display electrode 103, display scan electrode 104, dielectric glass layer 105, and MgO protective layer 106, all disposed on one main surface of front glass substrate 101; and a back panel with address electrode 107, dielectric glass layer 108, barrier rib 109, and phosphor layers 110R, 110G, and 110B, all disposed on one main surface of rear glass substrate 102. PDP 100 has a structure in which discharge gas is encapsulated in discharge space 122 formed between the front and back panels, and is connected to PDP driver 150 shown in FIG. 3, to compose a plasma display device.

Figure 3:
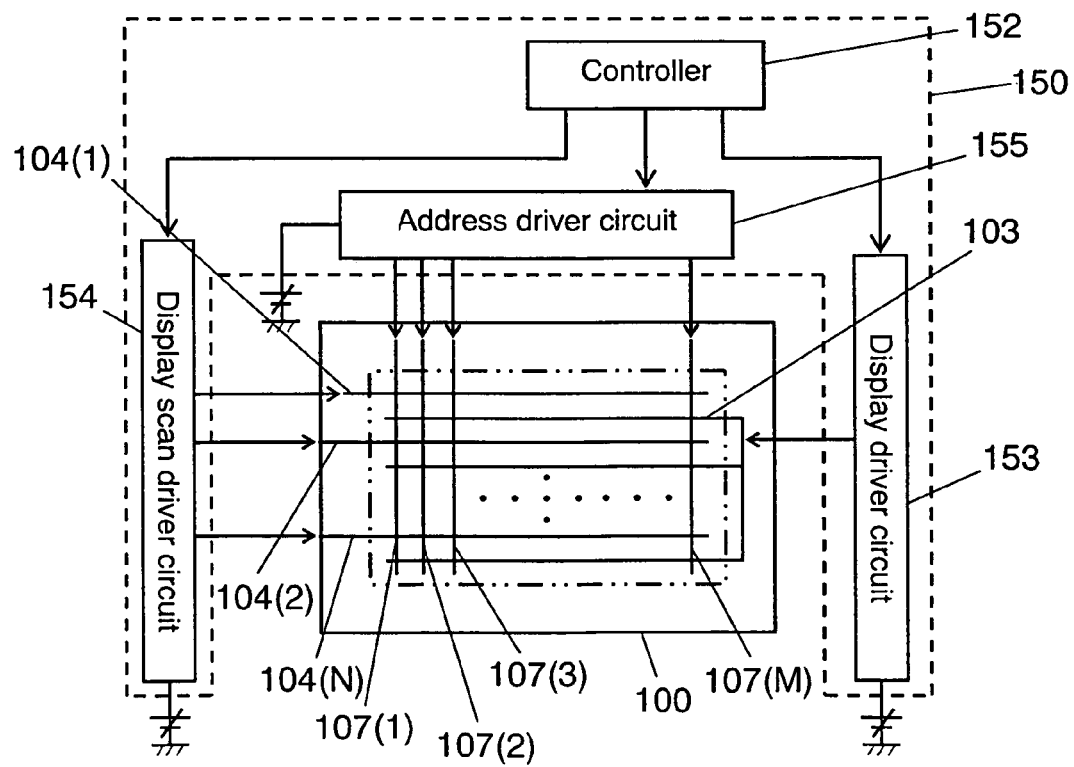
FIG. 3 is a block diagram of the plasma display device according to the embodiment of the present invention.

As shown in FIG. 3, the plasma display device has display driver circuit 153, display scan driver circuit 154, and address driver circuit 155, all in PDP 100. A discharge voltage is applied to display scan electrode 104 and address electrode 107 corresponding to a cell to be emitted, under control of controller 152, to perform address discharge between the electrodes. After that, a pulse voltage is applied between display electrode 103 and display scan electrode 104 to perform sustain discharge. This sustain discharge causes ultraviolet light to occur at a relevant cell. A phosphor layer excited by this ultraviolet light emits light, to light the cell, where a combination of emitted and non-emitted cells in each color displays an image.

Figure 4:
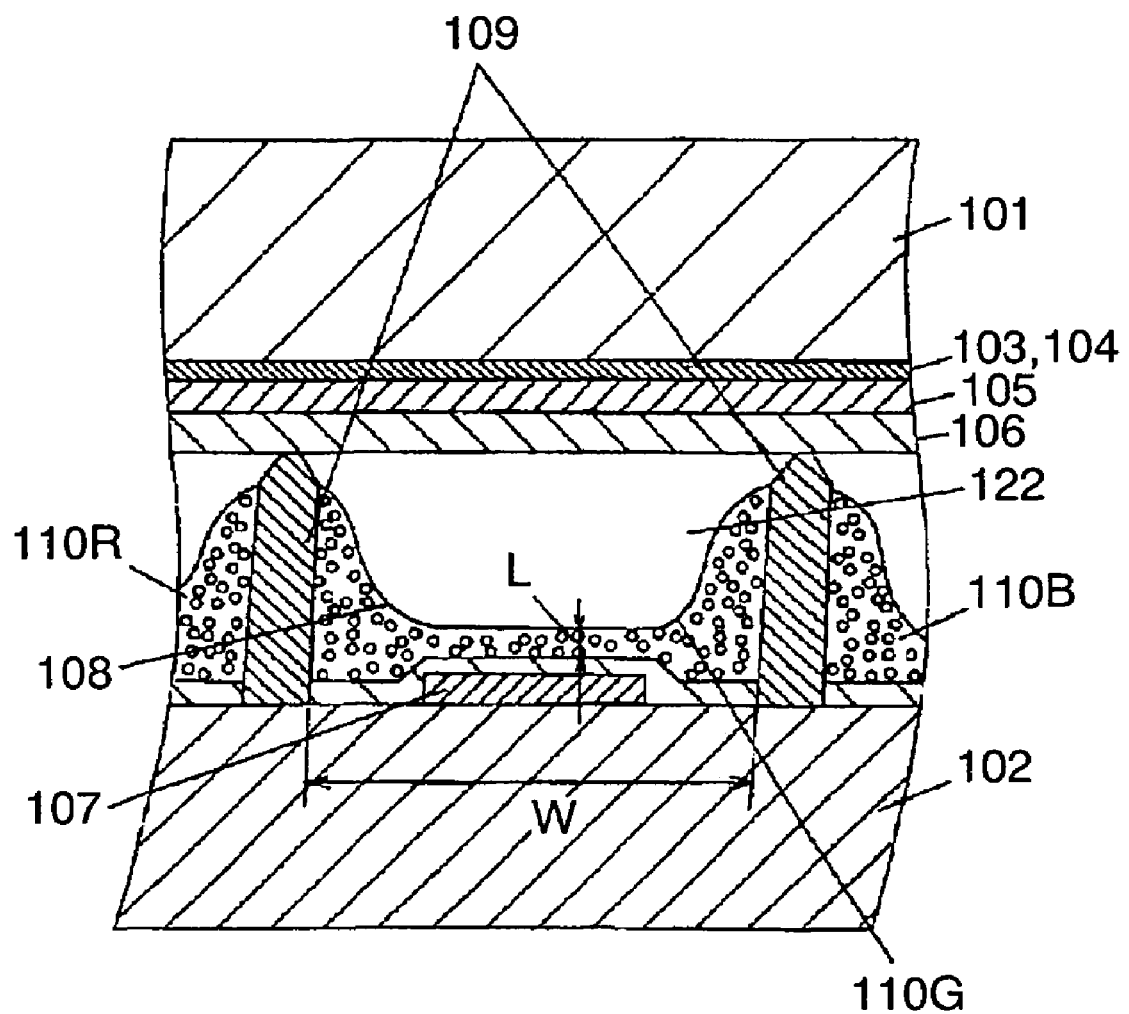
FIG. 4 is a sectional view illustrating the structure of the image display area of the PDP used for the plasma display device according to the embodiment of the present invention.

Next, a description will be made for a method of producing the above-mentioned PDP 100, referring to FIGS. 4 and 5. FIG. 4 is a sectional view illustrating the structure of the image display area of the PDP used for the plasma display device according to the embodiment of the present invention. In FIG. 4, the front panel is produced in the following way. That is, after forming display electrode 103 and display scan electrode 104, N pieces each (Only two pieces each are shown in FIG. 2.), alternately and parallel in a striped form on front glass substrate 101, cover the top of them with dielectric glass layer 105, and further form MgO protective layer 106 on the surface of dielectric glass layer 105.

Display electrode 103 and display scan electrode 104 are composed of a transparent electrode made of indium tin oxide (ITO) and a bus electrode made of silver. The bus electrode is formed from the silver paste being applied with screen-printing and then fired.

Dielectric glass layer 105 is formed from a paste including a lead-based glass material being applied with screen-printing and then fired at a given temperature for a given time (at 560° C. for 20 minutes, for example), so that the layer will have a given thickness (approximately 20 μm). A paste including the above-mentioned lead-based glass material is, for example, a mixture of PbO (70 wt %), $B_2O_3$ (15 wt %), $SiO_2$ (10 wt %), $Al_2O_3$ (5 wt %), and an organic binder (10% ethyl cellulose dissolved in alpha-terpineol). Here, an organic binder means a resin dissolved in an organic solvent, where an acrylic resin, besides ethyl cellulose, can be used as a resin, and butylcarbitol or the like can be also used as an organic solvent. Further, such an organic binder may immix glyceryl trileate, for example.

MgO protective layer 106, made of magnesium oxide (MgO), is formed with a method such as sputtering or chemical vapor deposition (CVD) so that the layer will have a given thickness (approximately 0.5 μm).

The back panel is formed from a silver paste for electrodes being screen-printed onto rear glass substrate 102 and then fired, into a state where M pieces of address electrodes 107 are installed in a row. A paste including a lead-based glass material is applied on the back panel with screen-printing, to form dielectric glass layer 108. In the same way, a paste including a lead-based glass material is applied repeatedly at a given pitch with screen-printing and then fired, to form barrier rib 109. This barrier rib 109 partitions discharge space 122 linewise into each cell (unit of light-emitting region). W, which is the gap between barrier ribs 109, is defined as between approximately 130 μm and 240 μm according to high-definition TV with its screen size between 32 inches and 50 inches.

Phosphor layers made of phosphor particles in red (R), blue (B), and green (G) are formed between barrier ribs 109, where the green particles are produced by firing the material with its element ratio of Zn/Si of 2.1/1 to 2.0/1, in an atmosphere with its pressure higher than 1 atmospheric pressure (0.102 MPa) including at least one of $N_2$, $N_2$—$O_2$, and Ar—$O_2$.

Phosphor layers 110R, 110G, and 110B, where phosphor particles are bound each other, are formed from a phosphor ink paste made of phosphor particles and an organic binder being applied and then fired at 400° C. to 590° C. to burn out the organic binder.

It is desirable to form phosphor layers 110R, 110G, and 110B, so that L, which is the lamination-wise thickness of the layers on address electrode 107, will be roughly 8 to 25 times the average particle diameter of the phosphor particles in each color. In other words, the phosphor layer desirably retains a thickness of at least 8 layers, and preferably about 20 layers of lamination, in order not to let ultraviolet light generated in the discharge space transmit but to be eliminated, for ensuring luminance (emission efficiency) when irradiating the phosphor layer with a certain amount of ultraviolet light. This is because the emission efficiency of the phosphor layer is almost saturated, and the size of discharge space 122 cannot be adequately ensured with a thickness of more than about 20 layers.

Meanwhile, phosphor particles which are small enough in their diameter and are spherical, such as those produced with a hydrothermal synthesis method or the like, raise the filling density of the phosphor layers and increase the total surface area of the phosphor particles, as compared to the case of unspherical particles and the same levels of lamination.

The front and back panels produced in this way are overlap each other so that respective electrodes on the front panel will be orthogonalized with the address electrodes on the back panel. In addition, the panels are sealed with sealing glass inserted to the periphery of the panels, and then fired at approximately 450° C. for 10 to 20 minutes, for example, to form hermetic seal layer 121. Next, after the inside of discharge space 122 is once exhausted to a high vacuum (e.g. $1.1 \times 10^{-4}$ Pa), discharge gas such as an He—Xe-based or He—Xe-based inactive gas is encapsulated at a given pressure, producing PDP 100.

Figure 5:
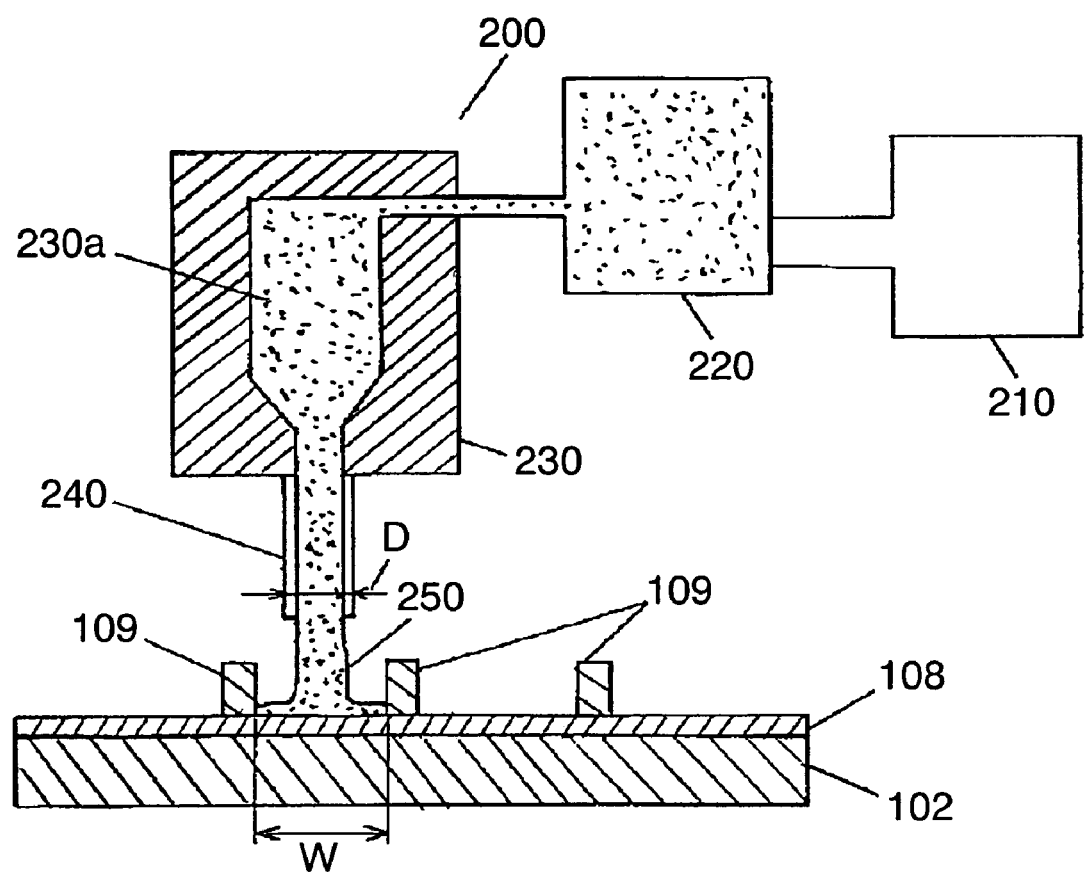
FIG. 5 is a schematic block diagram of an ink dispenser used when forming a phosphor layer of the PDP.

FIG. 5 is a schematic block diagram of ink dispenser 200 used when forming phosphor layers 110R, 110G, and 110B. As shown in FIG. 5, ink dispenser 200 includes server 210, pressure pump 220, and header 230. Phosphor ink supplied from server 210 for storing phosphor ink, pressurized by pressure pump 220, is supplied to header 230. Header 230 is provided with ink chamber 230a and nozzle 240, and the pressurized phosphor ink supplied to ink chamber 230a is discharged continuously through nozzle 240. D, which is the bore of this nozzle 240, is desirably 30 μm or larger for preventing clogging in the nozzle, and is desirably equal to W (approximately 130 μm to 200 μm) or less, where W is the gap between barrier ribs 109, for preventing the nozzle from protruding from barrier rib 109 when applying, where it is set usually between 30 μm to 130 μm.

Header 230 is linearly driven by a header scanning mechanism (not illustrated). Having header 230 scan as well as continuously discharging phosphor ink 250 through nozzle 240 allows the phosphor ink to be uniformly applied to the grooves between barrier ribs 109 on rear glass substrate 102. Here, the viscosity of the phosphor ink used is maintained between 1,500 centipoise (CP) and 50,000 CP at 25° C.

Still, above-mentioned server 210 is equipped with an agitation device (not illustrated), which prevents the particles in the phosphor ink from being precipitated. Header 230 is integrally molded with ink chamber 230a including nozzle 240, and is produced from a metallic material with machining and electric discharging.

Further, a method of forming a phosphor layer is not limited to the above-mentioned one, but various methods can be used such as a photolithographic method, screen-printing, and a method in which a film with phosphor particles mixed is disposed.

Phosphor ink is a mixture of phosphor particles in each color, a binder, and solvent, all blended so that the viscosity will range between 1,500 centipoise (CP) and 50,000 CP, where a surface active agent, silica, dispersant (0.1 wt % to 5 wt %), and others may be added as required.

A red phosphor blended in this phosphor ink is a compound expressed by $(Y, Gd)_{1-x}BO_3:Eu_x$ or $Y_{2x}O_3:Eu_x$. These are compounds in which Eu is substituted for a part of Y element composing its maternal material. Here, x, which is the substitution value of Eu element for Y element, is desirably in the range of $0.05 \leq x \leq 0.20$. For a substitution value more than this, the luminance significantly degrades although it increases, which is assumed to be impractical. Meanwhile, for a substitution value less than this, the composition ratio of Eu, which is the main element of light-emitting, decreases, as well as the luminance, thus making it useless as a phosphor.

A green phosphor uses a compound expressed by $[(Zn_{1-x}Mn_x)_2SiO_4]$ that has been fired in an atmosphere with its pressure higher than 1 atmospheric pressure (0.102 MPa) including at least one of $N_2$, $N_2$—$O_2$, and Ar—$O_2$. $[(Zn_{1-x}Mn_x)_2SiO_4]$ is a compound in which Mn is substituted for a part of Zn element composing its maternal material. Here, x, which is the substitution value of Mu element for Zn element, ia desirably in the range of $0.01 \leq x \leq 0.20$.

A blue phosphor uses a compound expressed by $Ba_{1-x}MgAl_{10}O_{17}:Eu_x$ or $Ba_{1-x-y}Sr_yMgAl_{10}O_{17}:Eu_x.Ba_{1-x}MgAl_{10}O_{17}:Eu_x$ and $Ba_{1-x-y}Sr_yMgAl_{10}O_{17}:Eu_x$ are compounds in which Eu or Sr is substituted for a part of Ba element composing its maternal material. Here, x and y, which are substitution values of Eu element for Ba element, is desirably in the range of $0.03 \leq x \leq 0.20$ and $0.1 \leq y \leq 0.5$.

As a binder blended in a phosphor ink, ethyl cellulose or acrylic resin (0.1 wt % to 10 wt % of ink is mixed) can be used; and as a solvent, alpha-terpineol or butylcarbitol can be used. Here, the binder may be polymer molecules such as PMA or PVA, and the solvent may be an organic solvent such as diethylene glycol or methyl ether.

In this embodiment, phosphor particles are manufactured with a solid-phase reaction method, an aqueous solution method, a spray firing method, or a hydrothermal synthesis method. A concrete example for a method of producing phosphor particles will be hereinafter described.

First, a description will be made of a method of producing a blue phosphor of $Ba_{1-x}MgAl_{10}O_{17}:Eu_x$ with an aqueous solution method.

In the process of producing a mixed solution, mix the raw materials of barium nitrate $Ba(NO_3)_2$, magnesium nitrate $Mg(NO_3)_2$, aluminium nitrate $Al(NO_3)_3$, and europium nitrate $Eu(NO_3)_2$, with the molar ratio of 1-x:1:10:x ($0.03 \leq x \leq 0.25$), and dissolve them into an aqueous medium to produce a mixed solution. This aqueous medium is desirably ion-exchanged water or pure water in that they do not include an impure substance; however, they can be used even if they include a nonaqueous solvent (e.g. methanol, ethanol). Next, put the hydrate liquid mixture into a container made of a material with resistance to corrosion and heat, such as gold or platinum, and then use a device capable of heating under pressure, such as an autoclave, to perform hydrothermal synthesis (for 12 to 20 hours) at a given temperature (100° C. to 300° C.), at a given pressure (0.2 MPa to 10 MPa), in a high-pressure container. Next, fire this powder in a reducing atmosphere (e.g. atmosphere including 5% of hydrogen and 95% of nitrogen) at a given temperature for a given time (e.g. at 1,350° C. for 2 hours), and classify this, to produce a desired blue phosphor of $Ba_{1-x}MgAl_{10}O_{17}:Eu_x$.

Phosphor particles produced with hydrothermal synthesis are spherical and have particle diameters smaller than those produced with the conventional solid-phase reaction, resulting in an average particle diameter of approximately 0.05 μm to 2.0 μm. Here, "spherical" is defined as the aspect ratio (minor axis diameter/major axis diameter) of most phosohor particles ranges between 0.9 and 1.0, for example, where all the phosphor particles do not necessarily need to fall in this range.

Alternatively, a blue phosphor can be produced with spraying, in which the hydrate mixture is not put into a gold or platinum container, but the mixture is sprayed through a nozzle to a high-temperature oven, to synthesize a phosphor.

Next, a description will be made of a method of producing a blue phosphor of $Ba_{1-x-y}Sr_yMgAl_{10}O_{17}:Eu_x$ manufactured with a solid-phase reaction method.

Weigh the raw materials of barium hydroxide $Ba(OH)_2$, strontium hydroxide $Sr(OH)_2$, magnesium hydroxide $Mg(OH)_2$, aluminum hydroxide $Al(OH)_3$, and europium hydroxide $Eu(OH)_2$, for a required molar ratio, and mix them along with $AlF_3$ as flux. After that, fire them at a given temperature (1,300° C. to 1,400° C.), for a given time (12 to 20 hours), to produce $Ba_{1-x-y}Sr_yMgAl_{10}O_{17}:Eu_x$ in which quadrivalent ions are substituted for Mg and Al. The average particle diameter of the phosphor particles produced with this method is approximately 0.1 μm to 3.0 μm. Next, after firing these particles in a reducing atmosphere, 5% hydrogen and 95% nitrogen, for example, at a given temperature (1,000° C. to 1600° C.), for a given time (2 hours), classify them with an air classifier to produce phosopher powder.

Here, oxide, nitrate salt, and hydroxide are mainly used as the raw materials for a phosphor. However, a phosphor can be produced also with an organometallic compound including elements such as Ba, Sr, Mg, Al, and Eu (e.g. metal alkoxide and acetylacetone).

Next, a description will be made of a green phosphor of $(Zn_{1-x}Mn)_2SiO_4$ produced with a solid-phase method.

First, mix the raw materials of zinc oxide (ZnO), silicon oxide ($SiO_2$), and manganese oxide MnO, so that the molar ratio of Zn to Mn will be, 1 x:x ($0.01 \leq x \leq 0.20$), and next mix the raw materials along with flux ($ZnF_2$, $MnF_2$) as required, so that the element ratio of Zn to Si will be 2.1/1 to 2.0/1. Pre-fire this mixture at 600° C. to 900° C. for 2 hours, and lightly crush the mixture to the extent of breaking the agglomerate. Next, fire this in an atmosphere with its pressure between 0.105 Mpa and 150 MPa including at least one of $N_2$, $N_2$—$O_2$, and Ar—$O_2$, at 1,000° C. to 1,350° C., to produce a green phosphor.

Next, a description will be made of the case where a green phosphor is produced with an aqueous solution method.

First, in the process of producing a mixed solution, use the raw materials of zinc nitrate $Zn(NO_3)_2$, manganese nitrate $Mn(NO_3)_2$, and tetraethoxysilane $[Si(O.C_2H_5)_4]$. First, mix them, so that the molar ratio of zinc nitrate to manganese nitrate will be 1-x:x ($0.01 \leq x \leq 0.20$). Next, in blending $Zn(NO_3)_2$ and $[Si(O.C_2H_5)_4]$, mix the raw materials so that the element ratio of Zn to Si will be 2.0/1, and put them into ion-exchanged water to produce a mixed solution.

Next, in a hydration process, drop a basic aqueous solution (e.g. aqueous ammonia solution) into this mixed solution to form hydrate. Then, pre-fire this hydrate at 600° C. to 900° C., and next fire this pre-fired matter in an atmosphere with its pressure higher than 0.105 Mpa including at least one of $N_2$, $N_2$—$O_2$, and Ar—$O_2$, at 1,000° C. to 1,350° C., for 2 to 20 hours, to produce a green phosphor.

Next, a description will be made of a method of producing a red phosphor with an aqueous solution method.

First, a red phosphor of $(Y, Gd)_{1-x}BO_3:Eu_x$ will be described. In the process of producing a mixed solution, mix the raw materials of yttrium nitrate $Y_2(NO_3)_3$, hydro nitrate gadolinium $Gd_2(NO_3)_3$, boric acid $H_3BO_3$, and europium nitrate $Eu_2(NO_3)_3$, so that the molar ratio will be 1-x:2:x ($0.05 \leq x \leq 0.20$) (The ratio of Y to Gd is 65:35.), and after heat-treating them at 1,200° C. to 1,350° C. in the air for 2 hours, classify them to produce a red phosphor.

Meanwhile, for a red phosphor of $Y_{2x}O_3:Eu_x$, in the process of producing a mixed solution, dissolve the raw materials of yttrium nitrate $Y_2(NO_3)_2$ and europium nitrate $Eu(NO_3)_2$ into ion-exchanged water, so that the molar ratio will be 2-x:x ($0.05 \leq x \leq 0.30$), to produce a mixed solution. Next, in a hydration process, add a basic aqueous solution (e.g. aqueous ammonia solution) to this aqueous solution to form hydrate. After that, in hydrothermal synthesis process, put the hydrate and ion-exchanged water into a container with resistance to corrosion and heat, such as platinum or gold, and then perform hydrothermal synthesis in a high-pressure container such as an autoclave, at 100° C. to 300° C. at a pressure between 0.2 MPa and 10 MPa for 3 to 12 hours. After that, dry the yielded compound to produce desired $Y_{2x}O_3:Eu_x$. Next, after annealing this phosphor in the air at 1,300° C. to 1,400° C. for 2 hours, classify it to form a red phosphor.

EVALUATION EXPERIMENT

Hereinafter, in order to evaluate the performance of the plasma display device according to the present invention, an evaluation experiment is made for sample devices using phosphors according to the above-mentioned embodiment.

The respective plasma display devices are produced so that they will have a 42-inch size (specification of high-definition TV with its rib pitch of 150 μm), the thickness of the dielectric glass layer is 20 μm, the thickness of the MgO protective layer is 0.5 μm, and the distance between the display electrode and display scan electrode is 0.08 mm. The discharge gas to be encapsulated in the discharge space is a neon-based gas with a xenon gas mixed by 5%, encapsulated at a given discharge-gas pressure.

A total of 9 samples are produced for plasma display devices. In these samples, a $[(Zn_{1-x}Mn_x)_2SiO_4]$ phosphor produced at a pressure as high as between 0.105 Mpa and 150 Mpa is used for a green phosphor. Table 1 shows the conditions of synthesis and the methods of producing for each phosphor used in these samples.

TABLE 1

| Sample number | Amount of Mn: x | Pre-Firing temperature (° C.) | Atmosphere and temperature in actually firing | Pressure in actually firing (Mpa) | Amount of Eu: x | Method of manufacturing | Amount of Mn: x | Method of manufacturing |
|---|---|---|---|---|---|---|---|---|
| | Green phosphor $[(Zn_{1-x}Mn_x)_2SiO_4]$ Solid-phase method | | | | Red phosphor $[(Y, Gd)_{1-x}BO_3:Eu_x]$ | | Blue phosphor $[Ba_{1-x}MgAl_{10}O_{17}:Eu_x]$ | |
| 1 | x = 0.02 | In the air, 600° C., 2 hours | In $N_2$, 1,200° C., 3 hours | 20 | x = 0.1 | Solid-phase reaction method | x = 0.1 | Solid-phase reaction method |
| 2 | x = 0.05 | In the air, 750° C., 2 hours | In $N_2$—$O_2$, 1,350° C., 3 hours | 150 | x = 0.2 | (same as the above) | x = 0.2 | (same as the above) |
| 3 | x = 0.1 | In the air, 850° C., 2 hours | In $N_2$, 1,150° C., 3 hours | 10 | x = 0.3 | (same as the above) | x = 0.5 | (same as the above) |
| 4 | x = 0.2 | In the air, 900° C., 2 hours | In Ar—$O_2$, 1,000° C., 10 hours | 0.105 | x = 0.15 | (same as the above) | x = 0.1 | (same as the above) |
| | Green phosphor $[(Zn_{1-x}Mn_x)_2SiO_4]$ Liquid-phase method | | | | Red phosphor $[(Y_{1-x})_2O_3Eu_x]$ | | Blue phosphor $[Ba_{1-x-y}Sr_yMgAl_{10}O_{17}:Eu_x]$ | |
| 5 | x = 0.01 | In the air, 700° C., 3 hours | In $N_2$—$O_2$, 1,300° C., 3 hours | 50 | x = 0.01 | Aqueous solution method | x = 0.2, y = 0.1 | Aqueous solution method |
| 6 | x = 0.03 | In the air, 800° C., 3 hours | In Ar—$O_2$, 1,300° C., 10 hours | (same as the above) | x = 0.1 | (same as the above) | x = 0.3, y = 0.3 | (same as the above) |
| 7 | x = 0.05 | (same as the above) | In $N_2$—$O_2$, 1,300° C., 3 hours | (same as the above) | x = 0.15 | (same as the above) | x = 0.4, y = 0.5 | (same as the above) |
| 8 | x = 0.1 | (same as the above) | (same as the above) | (same as the above) | x = 0.2 | Solid-phase reaction method | x = 0.5, y = 0.3 | (same as the above) |
| 9 | x = 0.05 | (same as the above) | (same as the above) | (same as the above) | (same as the above) | (same as the above) | x = 0.15, y = 0.5 | (same as the above) |
| 10* | (same as the above) | (same as the above) | (same as the above) | 1 atmospheric pressure (0.101 Mpa) | (same as the above) | (same as the above) | (same as the above) | (same as the above) |

*Sample number 10 is for a comparative example.

Samples 1 through 4 are combinations of a green phosphor using $(Zn_{1-x}Mn_x)_2SiO_4$ produced with a solid-phase synthesis method; a red phosphor, $(Y, Gd)_{1-x}BO_3:Eu_x$; and a blue phosphor, $(Ba_{1-x}MgAl_{10}O_{17}:Eu_x)$. Each sample shows variation in the method of synthesizing a phosphor; substitution ratios of Mn and Eu, which are the main elements for light-emitting, namely the substitution ratio of Mn to Zn element and the substitution ratio of Eu to Y and Ba elements; and the pressure in actually firing for a green phosphor, as shown in table 1.

Samples 5 through 9 are combinations of a red phosphor using $(Y_{1-x})_2O_3:Eu_x$; a green phosphor, $(Zn_{1-x}Mn_x)_2SiO_4$ produced with a liquid-phase method; and a blue phosphor, $Ba_{1-x-y}Sr_yMgAl_{10}O_{17}:Eu_x$. Each sample shows, in the same way as the above, variation in the method of synthesizing a phosphor; and the pressure in actually firing for a green phosphor, as shown in table 1.

Phosphor ink used for forming a phosphor layer is produced by mixing a phosphor, resin, solvent, and dispersant, using each phosphor particle shown by table 1.

The measurement result shows that the viscosity of the phosphor ink at that time (25° C.) all remains in the range between 1,500 CP and 50,000 CP. In all the phosphor layers formed, the side faces of the barrier ribs are found by observation to be uniformly coated with phosphor ink.

The bore of the nozzle used for coating then is 100 μm, and phosphor particles used for phosphor layers have an average particle diameter of 0.1 μm to 3.0 μm and a maximum particle size of 8 μm or less.

Sample 10 is a comparative sample where a green phosopher layer is formed using green phosopher particles with their surfaces negatively charged, produced at 1 atmospheric pressure (0.101 Mpa), which is a conventional example.

Experiment 1

A measurement is made of the charging tendency for the green phosphors in samples 1 through 9 and comparative sample 10. Here, the measurement adopts blow-off method, which measures the amount of charge for reduced iron powder.

Experiment 2

A measurement is made of the element ratio of Zn to Si at the proximity (approximately 10 nm in depth) of the surface with X-Ray photoelectron spectroscopy (XPS) for samples 1 through 9 and comparative sample 10 produced.

Experiment 3

A measurement is made of the luminance of a PDP when displaying full white after the PDP producing process, and the luminance of green and blue phosphor layers, with a luminance meter.

Experiment 4

A measurement is made of the rate of luminance change when displaying full white, green, and blue as follows: That is, apply discharge sustain pulses with 185 V, 100 kHz, to a plasma display device for 1,000 hours continuously, measure the luminance of the PDP before and after then, and calculate the luminance degradation factor (<[luminance after application−luminance before application]/luminance before application>*100)

An address error during address discharge is judged from at least a single flicker on the screen.

Experiment 5

Clogging in the nozzle is checked when green phosphor ink is applied using a nozzle with its bore of 100 μm, for 100 hours continuously.

Table 2 shows experimental results of the luminance and the rate of luminance change in blue, and of clogging in the nozzle, in experiments 1 through 5.

TABLE 2

| Sample number | Zn/Si ratio of green phosphor with XPS and charging tendency Zn/Si ratio Charging endency | Luminance of panel in green Cd/cm2 | Rate of luminance change (%) of panel after discharge sustain pulses with 185 V, 100 kHz applied for 1,000 hours | | Address error during address discharge | Clogging in nozzle (200 hours) |
| --- | --- | --- | --- | --- | --- | --- |
| | | | Green | Blue | | |
| 1 | 2.0/1 + | 251.0 | −1.0 | −2.5 | No | No |
| 2 | (same as the above) + | 268.0 | −1.3 | −2.3 | (same as the above) | (same as the above) |
| 3 | (same as the above) 0 | 274.0 | −0.9 | −2.4 | (same as the above) | (same as the above) |
| 4 | (same as the above) 1 | 255.0 | −1.1 | −2.2 | (same as the above) | (same as the above) |
| 5 | 2.0/1 + | 242.0 | −1.3 | −2.2 | (same as the above) | (same as the above) |
| 6 | (same as the above) + | 257.0 | −1.4 | −2.5 | (same as the above) | (same as the above) |
| 7 | (same as the above) + | 273.9 | −1.2 | −2.1 | (same as the above) | (same as the above) |
| 8 | (same as the above) + | 270.0 | −1.5 | −2.2 | (same as the above) | (same as the above) |
| 9 | (same as the above) + | 268.0 | −1.6 | −2.3 | (same as the above) | (same as the above) |
| 10* | 1.92/1 − | 240.0 | −28.3 | −5.1 | Yes | Yes |

*Sample number 10 is for a comparative example.

As shown in table 2, in comparative sample 10, which uses a green phosphor made of negatively charged $(Zn_{1-x}Mn_x)_2SiO_4$ produced with the conventional producing method, a large luminance degradation factor is shown in green and blue in an accelerated life due to the negative charge. Particularly, an accelerated life test in the condition of 185 V, 100 kHz, and 1,000 hours, shows −28.3% of the rate of change in displaying green. Meanwhile, in samples 1 through 9, where the surface of the green phosphors according to the present invention has its element ratio of Zn/Si equal to its stoichiometric ratio and positively charged or zero-charged, the rate of change is as low as −0.9% to −1.6%. The rate of the change in luminance in blue is −5.1% in the comparative sample, while in samples 1 through 9, the rate is all between −2.1% and −2.5%, and an address error and clogging in the nozzle when applying phosphors do not occur.

This is presumably because positively charging or zero-charging $(Zn_{1-x}Mn_x)_2SiO_4$, which is a negatively charged green phosphor, causes the phosphor to be immune to an impact of positive ions such as neon ions ($Ne^+$) and $CH_x$-based ions ($CH_x^+$) existing in the discharge space of the panel, suppressing luminance degradation. The reason why address errors have been eliminated is homogenization of address discharge as a result that the green phosphor is positively charged, which is the same as for the red and blue ones. Still, the reason why clogging in the nozzle has been eliminated is presumably the improved dispersibility of the phosphor ink because the ethyl cellulose in the binder is prone to adsorbing a positively charged green phosphor.

INDUSTRIAL APPLICABILITY

As above-mentioned, according to the present invention, a green phosphor $(Zn_{1-x}Mn_x)_2SiO_4$ composing a phosphor layer is positively charged or zero-charged, by being fired in an atmosphere with its pressure between 0.105 MPa and 150 MPa including at least one of $N_2$, $N_2$—$O_2$, and Ar—$O_2$, to homogenize coating condition, to prevent deterioration, of the phosphor layer, and also to improve the luminance, life, and reliability, of a PDP, thus effectively improving the performance of the plasma display device.

The invention claimed is:

1. A method of producing a phosphor for a plasma display device, comprising:
    a process in which one of metal salt, nitrate salt, and organometallic salt, including zinc, silicon and manganese elements which comprise a green phosphor, are blended so that an element ratio of Zn to Si is to be 2/1, and then the salt and water are mixed to produce mixed liquid;
    a pre-firing process in which, after the mixed liquid is dried, the mixed liquid is fired in an air at 600° C. to 900° C., to produce pre-fired matter; and
    a firing process in which the pre-fired matter is fired in an atmosphere including at least one of $N_2$, $N_2$—$O_2$, and Ar—$O_2$, between 0.105 MPa and 150 MPa inclusive, at 1,000° C. to 1,350° C.

2. A method of producing a phosphor for a plasma display device, comprising:
    a process of mixing a raw material for a phosphor, in which a raw material of oxide and/or carbonate including zinc, silicon and manganese elements which comprise a green phosphor, are mixed;
    a pre-firing process in which the mixed raw material is fired in an air at 600° C. to 900° C., to produce pre-fired matter; and
    a firing process in which the pre-fired matter is fired in an atmosphere including at least one of $N_2$, $N_2$—$O_2$, and Ar—$O_2$, between 0.105 MPa and 150 MPa inclusive, at 1,000° C. to 1,350° C.

* * * * *